United States Patent
Baek et al.

(10) Patent No.: US 8,150,986 B2
(45) Date of Patent: Apr. 3, 2012

(54) DATA PROCESSING METHOD FOR APPLICATION LAYER

(75) Inventors: Seung-Myun Baek, Changwon-shi (KR); Koon-Seok Lee, Changwon-shi (KR); Yong-Tae Kim, Gimhae-shi (KR)

(73) Assignee: LG Electronics Inc., Seoul (KR)

( * ) Notice: Subject to any disclaimer, the term of this patent is extended or adjusted under 35 U.S.C. 154(b) by 968 days.

(21) Appl. No.: 10/594,616

(22) PCT Filed: Mar. 31, 2005

(86) PCT No.: PCT/KR2005/000949
§ 371 (c)(1),
(2), (4) Date: Jun. 9, 2008

(87) PCT Pub. No.: WO2005/094194

PCT Pub. Date: Oct. 13, 2005

(65) Prior Publication Data
US 2009/0007156 A1    Jan. 1, 2009

(30) Foreign Application Priority Data

Mar. 31, 2004 (KR) .................. 10-2004-0022213
Mar. 31, 2004 (KR) .................. 10-2004-0022214
Mar. 31, 2004 (KR) .................. 10-2004-0022215

(51) Int. Cl.
*G06F 15/16* (2006.01)
*H04M 3/42* (2006.01)
(52) U.S. Cl. .................. 709/230; 379/201.03
(58) Field of Classification Search .................. 709/230; 379/201.03
See application file for complete search history.

(56) References Cited

U.S. PATENT DOCUMENTS 6,621,895 B1 * 9/2003 Giese .................. 379/201.03
6,760,308 B1 * 7/2004 Ghanma et al. .................. 370/235

OTHER PUBLICATIONS

Koon-Seok Lee, A new control protocol for home appliances—LnCP, 7803-7090—ISIE—2001.*
Seungcheon Kim et al., "Home Networking Digital TV based on LnCP," IEEE Transactions on Consumer Electronics, vol. 48, Issue 4, Nov. 2002, pp. 990-996.
Jae-Min Lee, et al., "A New Home Network Protocol for Controlling and Monitoring Home Appliances—HNCP," Consumer Electronics 2002, ICCE, 2002 Digest of Technical Papers, International Conference on; Jun. 18-20, 2002, pp. 312-313.
Koon-Seok Lee, et al., "Network Configuration Technique for Home Appliances," Consumer Electronics, 2002, ICCE, 2002—Digest of Technical Papers, International Conference on; Jun. 18-20, 2002, pp. 180-181.
Koon-Seok, Lee et al., "A New Control Protocol for Home Appliances—LnCP", Industrial Electronics, 2001 Proceedings, ISIE 2001, IEEE International Symposium on vol. 1, Jun. 12-16, 2001, pp. 286-291.

* cited by examiner

*Primary Examiner* — Asghar Bilgrami
(74) *Attorney, Agent, or Firm* — McKenna Long & Aldridge LLP

(57) ABSTRACT

The present invention discloses a data processing method for application layer based on a living network control protocol. The data processing method for application layer which is based on a predetermined protocol composed of at least a lower layer and an application layer includes the steps of: receiving a predetermined primitive from an upper application software; generating a communication cycle identifier (CycleID) according to the primitive; generating a service description according to the primitive and the communication cycle identifier (CycleID); composing an application layer protocol data unit (APDU) including the primitive; and transmitting the APDU to the lower layer.

32 Claims, 15 Drawing Sheets

FIG.13

| CC | AUG1 | AUG2 | ...... |
|----|------|------|--------|

FIG.14

| CC | TOTALPAGE | CURRENTPAGE | ...... |
|----|-----------|-------------|--------|

FIG.15

| CC | PAGENO | DATANO | ...... |
|----|--------|--------|--------|

| CC | ACK | AUG1 | AUG2 | ...... |

| CC | NAK | NAK_CODE |

| CC | NAK | NAK_CODE | ERROR_CODE |

FIG.22

| Field | NODE ADDRESS | 0x00 | COMMAND CODE |
|---|---|---|---|
| # of bits | 16 | 8 | 8 |

DATA PROCESSING METHOD FOR APPLICATION LAYER

This application claims the benefit of Korean Patent Application No. 2004-0022215, filed on Mar. 31, 2004; Korean Patent Application No. 2004-0022214, filed Mar. 31, 2004, Korean Patent Application No. 2004-0022213, filed Mar. 31, 2004 and PCT Application No. PCT/KR2005/000949, filed on Mar. 31, 2005, which are hereby incorporated by reference for all purposes as if fully set forth herein.

TECHNICAL FIELD

The present invention relates in general to a data processing method, and more particularly to, a data processing method for application layer using a living network control protocol.

BACKGROUND ART

A home network connects various digital home appliances so that the user can always enjoy convenient, safe and economic life services inside or outside the house. Refrigerators or washing machines called white home appliances have been gradually digitalized due to the development of digital signal processing techniques, home appliance operating system techniques and high speed multimedia communication techniques have been integrated on the digital home appliances, and new information home appliances have been developed, to improve the home network.

As shown in Table 1, the home network is classified into a data network, an entertainment network and a living network by types of services.

TABLE 1

| Classification | Function | Service type |
| --- | --- | --- |
| Data network | Network between PC and peripheral devices | Data exchange, internet service, etc. |
| Entertainment network | Network between A/V devices | Music, animation service, etc. |
| Living network | Network for controlling home appliances | Home appliances control, home automation, remote meter reading, message service, etc. |

Here, the data network is built to exchange data between a PC and peripheral devices or provide an internet service, and the entertainment network is built between home appliances using audio or video information. In addition, the living network is built to simply control home appliances, such as home automation or remote meter reading.

A conventional home network system includes a master device which is an electric device for controlling an operation of the other electric devices or monitoring a status thereof, and a slave device which is an electric device having a function of responding to the request of the master device and a function of notifying a status change according to characteristics of the electric devices or other factors. Exemplary electric devices include home appliances for the living network service such as a washing machine and a refrigerator, home appliances for the data network service and the entertainment network service, and products such as a gas valve control device, an automatic door device and an electric lamp.

However, the conventional arts do not suggest a general communication standard for providing functions of controlling and monitoring electric devices in a home network system. Also, a network protocol in the conventional art home network system does not suggest an effective method for receiving and transmitting a packet.

DISCLOSURE OF THE INVENTION

The present invention is achieved to solve the above problems. An object of the present invention is to provide a data processing method for application layer using a control protocol which is a general communication standard for providing functions of controlling and monitoring electric devices in the home network system.

Another object of the present invention is to provide a data processing method for application layer using a living network control protocol as a general communication standard.

Still another object of the present invention is to provide a plurality of united primitives for transmitting data in a living network control protocol.

Still another object of the present invention is to provide a data processing method for application layer, in which an upper layer including the application layer generates, transmits and processes a message.

Still another object of the present invention is to provide a data processing method for application layer, which performs one or more communication cycles according to the characteristics of a message.

Still another object of the present invention is to provide a data processing method for application layer capable of controlling a data receiving process through a predetermined parameter (communication cycle control).

Still another object of the present invention is to provide a data processing method for application layer of a slave device, in which an upper layer including the application layer generates, transmits and processes a message.

Still another object of the present invention is to provide a data processing method for application layer capable of controlling a data receiving process by enabling or disabling data reception.

Still another object of the present invention is to provide a data processing method for application layer of a master device, in which an upper layer including the application layer generates, transmits and processes a message.

Yet another object of the present invention is to provide a data processing method for application layer capable of processing data according to the characteristics of a message.

In order to achieve the above-described objects of the invention, there is provided a data processing method for application layer based on a predetermined protocol composed of at least a lower layer and an application layer, which the method includes the steps of: receiving a predetermined primitive from an upper application software; generating a communication cycle identifier (CycleID) according to the primitive; generating a service description according to the primitive and the communication cycle identifier (CycleID); composing an application layer protocol data unit (APDU) including the primitive; and transmitting the APDU to the lower layer.

BRIEF DESCRIPTION OF THE DRAWINGS

FIGS. 13 to 15 illustrate structures of request messages, respectively;

FIG. 22 illustrates a structure of a communication cycle identifier CycleID in accordance with the present invention;

BEST MODE FOR CARRYING OUT THE INVENTION

A data processing method for application layer in accordance with the present invention will now be described in detail with reference to the accompanying drawings.

Figure 1:
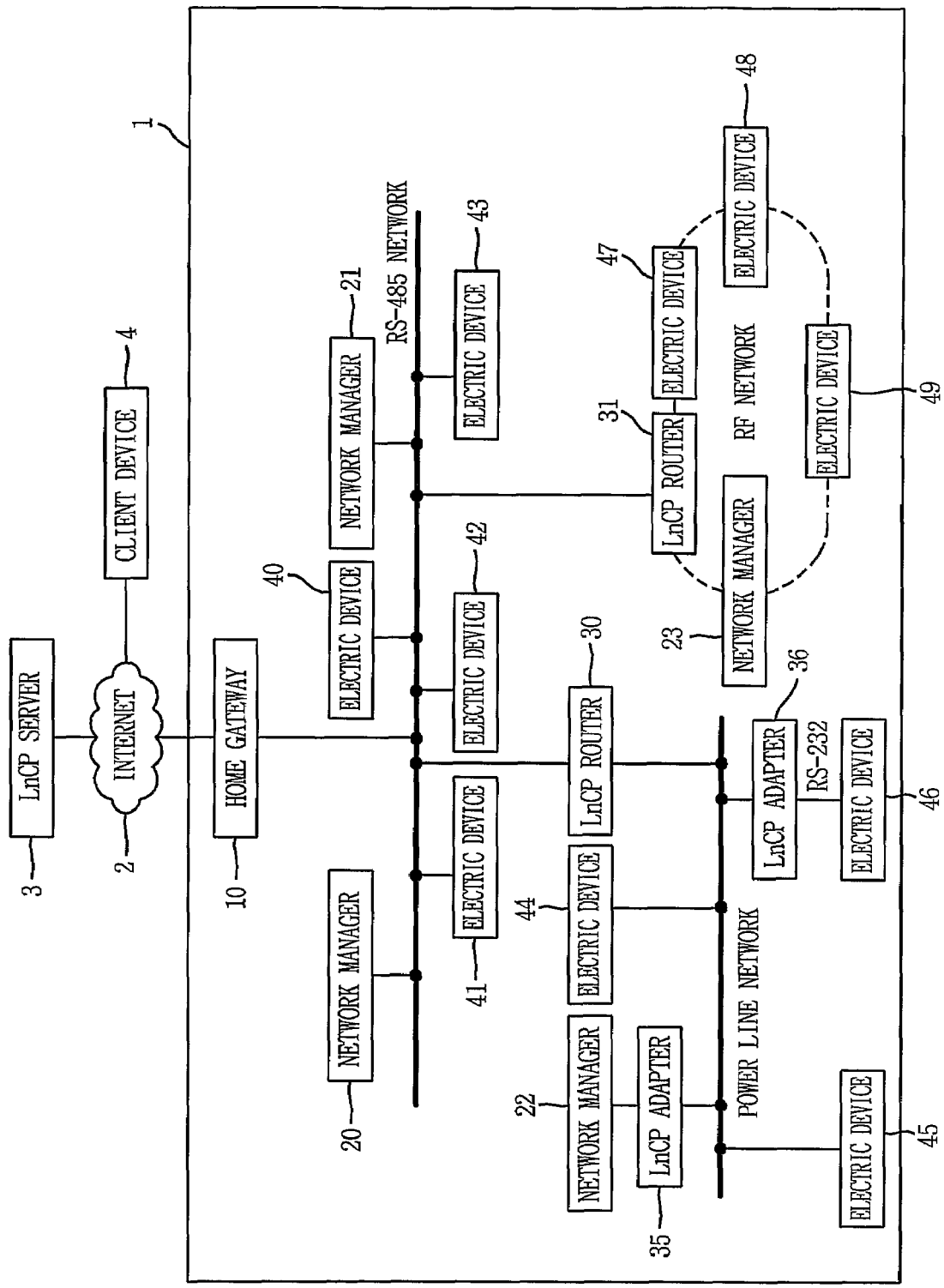
FIG. 1 is a structure view illustrating a home network system in accordance with the present invention.

FIG. 1 is a structure view illustrating the home network system in accordance with the present invention.

Referring to FIG. 1, the home network system 1 accesses an LnCP server 3 through an internet 2, and a client device 4 accesses the LnCP server 3 through the internet 2. That is, the home network system 1 is connected to communicate with the LnCP server 3 and/or the client device 4.

An external network of the home network system 1 such as the internet 2 includes additional constitutional elements according to a kind of the client device 4. For example, when the client device 4 is a computer, the internet 2 includes a Web server (not shown), and when the client device 4 is an internet phone, the internet 2 includes a Wap server (not shown).

The LnCP server 3 accesses the home network system 1 and the client device 4 according to predetermined login and logout procedures, respectively, receives monitoring and control commands from the client device 4, and transmits the commands to the network system 1 through the internet 2 in the form of predetermined types of messages. In addition, the LnCP server 3 receives a predetermined type of message from the home network system 1, and stores the message and/or transmits the message to the client device 4. The LnCP server 3 also stores or generates a message, and transmits the message to the home network system 1. That is, the home network system 1 accesses the LnCP server 3 and downloads provided contents.

The home network system 1 includes a home gateway 10 for performing an access function to the internet 2, network managers 20 to 23 for performing a function of setting an environment and managing electric devices 40 to 49, LnCP routers 30 and 31 for access between transmission media, LnCP adapters 35 and 36 for connecting the network manager 22 and the electric device 46 to the transmission medium, and the plurality of electric devices 40 to 49.

The network of the home network system 1 is formed by connecting the electric devices 40 to 49 through a shared transmission medium. A data link layer uses a non-standardized transmission medium such as RS-485 or small output RF, or a standardized transmission medium such as a power line and IEEE 802.11 as the transmission medium.

The network of the home network system 1 is separated from the internet 2, for composing an independent network for connecting the electric devices through wire or wireless transmission medium. Here, the independent network includes a physically-connected but logically-divided network.

The home network system 1 includes master devices for controlling operations of the other electric devices 40 to 49 or monitoring statuses thereof, and slave devices having functions of responding to the request of the master devices and notifying their status change information. The master devices include the network managers 20 to 23, and the slave devices include the electric devices 40 to 49. The network managers 20 to 23 include information of the controlled electric devices 40 to 49 and control codes, and control the electric devices 40 to 49 according to a programmed method or by receiving inputs from the LnCP server 3 and/or the client device 4. Still referring to FIG. 1, when the plurality of network managers 20 to 23 are connected, each of the network managers 20 to 23 must be both the master device and the slave device, namely physically one device but logically the device (hybrid device) for simultaneously performing master and slave functions in order to perform information exchange, data synchronization and control with the other network managers 20 to 23.

In addition, the network managers 20 to 23 and the electric devices 40 to 49 can be connected directly to the network (power line network, RS485 network and RF network) or through the LnCP routers 30 and 31 and/or the LnCP adapters 35 and 36.

The electric devices 40 to 49 and/or the LnCP routers 30 and 31 and/or the LnCP adapters 35 and 36 are registered in the network managers 20 to 23, and provided with intrinsic logical addresses by products (for example, 0x00, 0x01, etc.). The logical addresses are combined with product codes (for example, 0x02 of air conditioner and 0x01 of washing machine), and used as node addresses. For example, the electric devices 40 to 49 and/or the LnCP routers 30 and 31 and/or the LnCP adapters 35 and 36 are identified by the node addresses such as 0x0200 (air conditioner 1) and 0x0201 (air conditioner 2). A group address for identifying at least one electric device 40 to 49 and/or at least one LnCP router 30 and 31 and/or at least one LnCP adapter 35 and 36 at a time can be used according to a predetermined standard (all identical products, installation space of products, user, etc.). In the group address, an explicit group address is a cluster for designating a plurality of devices by setting an address option value (flag mentioned below) as 1, and an implicit group address designates a plurality of devices by filling the whole bit values of the logical addresses and/or the product codes with 1. Especially, the implicit group address is called a cluster code.

Figure 2:
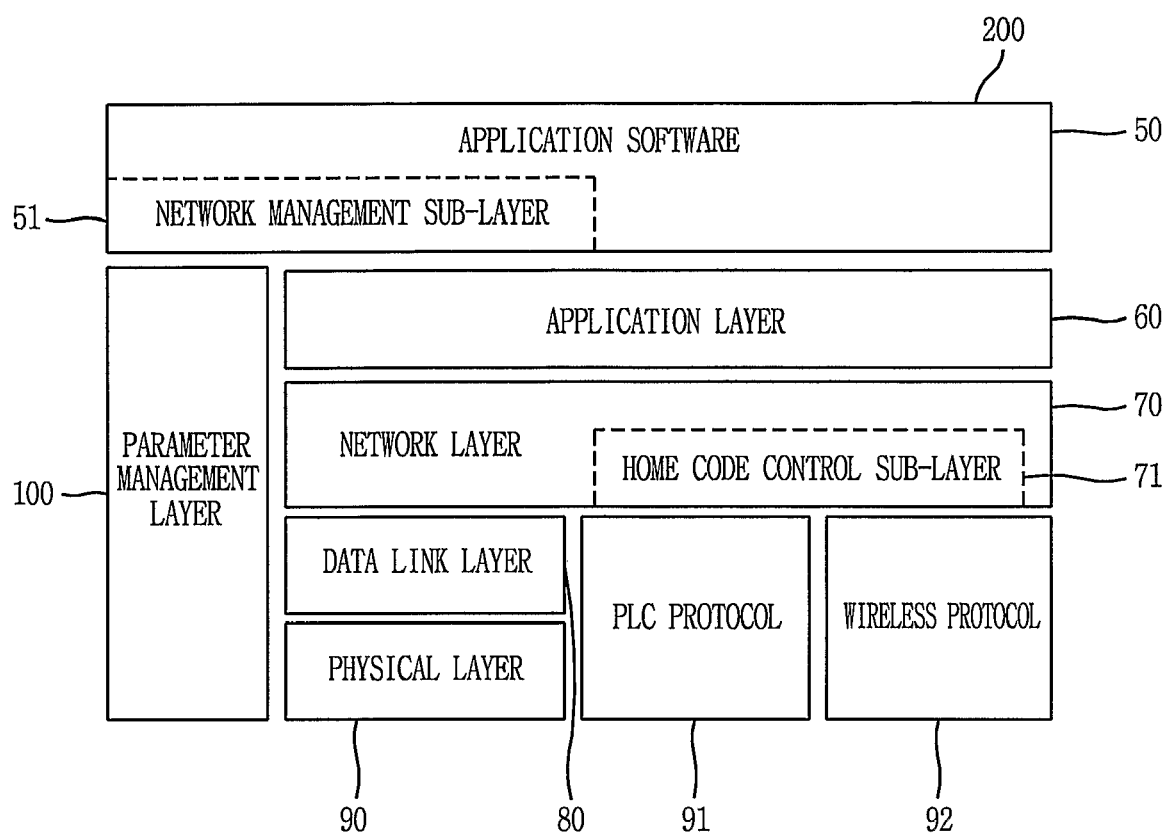
FIG. 2 is a structure view illustrating a living network control protocol stack in accordance with the present invention.

FIG. 2 is a structure view illustrating a living network control protocol stack in accordance with the present invention. The home network system 1 enables the network managers 20 to 23, the LnCP routers 30 and 31, the LnCP adapters 35 and 36 and the electric devices 40 to 49 to communicate with each other according to the living network control protocol (LnCP) of FIG. 2. Therefore, the network managers 20 to 23, the LnCP routers 30 and 31, the LnCP adapters 35 and 36 and the electric devices 40 to 49 perform network communication according to the LnCP.

As illustrated in FIG. 2, the LnCP includes an application software 50 for performing intrinsic functions of the network managers 20 to 23, the LnCP routers 30 and 31, the LnCP adapters 35 and 36 and the electric devices 40 to 49, and providing an interface function with an application layer 60 for remote controlling and monitoring on the network, the application layer 60 for providing services to the user, and also providing a function of forming information or a command from the user in the form of a message and transmitting the message to the lower layer, a network layer 70 for reliably network-connecting the network managers 20 to 23, the LnCP routers 30 and 31, the LnCP adapters 35 and 36 and the electric devices 40 to 49, a data link layer 80 for providing a medium access control function of accessing a shared transmission medium, a physical layer 90 for providing physical interfaces between the network managers 20 to 23, the LnCP routers 30 and 31, the LnCP adapters 35 and 36 and the electric devices 40 to 49, and rules for transmitted bits, and a parameter management layer 100 for setting and managing node parameters used in each layer.

In detail, the application software 50 further includes a network management sub-layer 51 for managing the node parameters, and the network managers 20 to 23, the LnCP routers 30 and 31, the LnCP adapters 35 and 36 and the electric devices 40 to 49 which access the network. That is, the network management sub-layer 51 performs a parameter management function of setting or using the node parameter values through the parameter management layer 100, and a network management function of composing or managing the network when the device using the LnCP is a master device.

When the network which the network managers 20 to 23, the LnCP routers 30 and 31, the LnCP adapters 35 and 36 and the electric devices 40 to 49 access is a dependent transmission medium such as a power line, IEEE 802.11 and wireless (for example, when the LnCP includes a PLC protocol and/or wireless protocol), the network layer 70 further includes a home code control sub-layer 71 for performing a function of setting, managing and processing home codes for logically dividing each individual network. When the individual networks are physically divided by an independent transmission medium such as RS-485, the home code control sub-layer 71 is not included in the LnCP. Each of the home codes is comprised of 4 bytes, and set as random values or designated values of the user.

Figure 3:
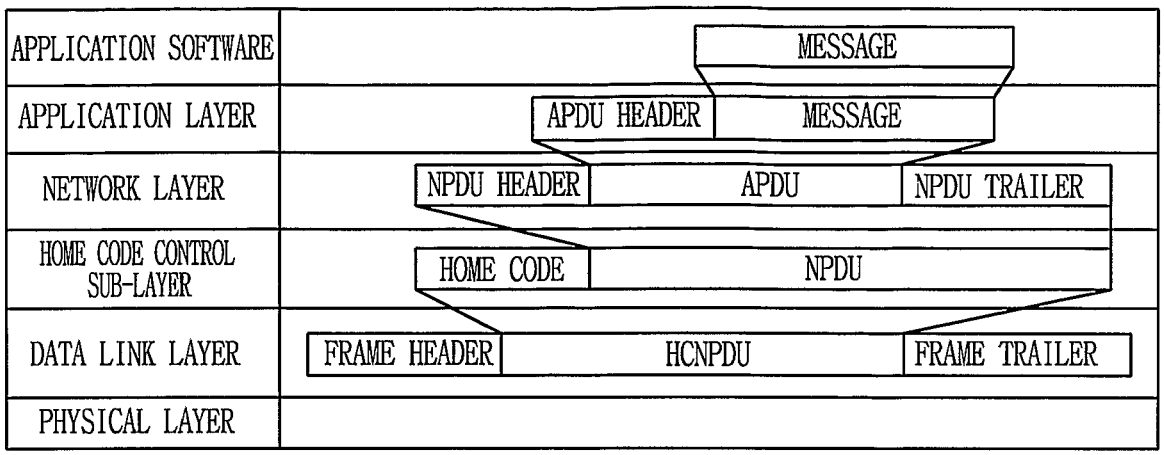
FIGS. 3 and 4 are structure views illustrating interfaces between layers of FIG. 2, respectively.
Figure 4:
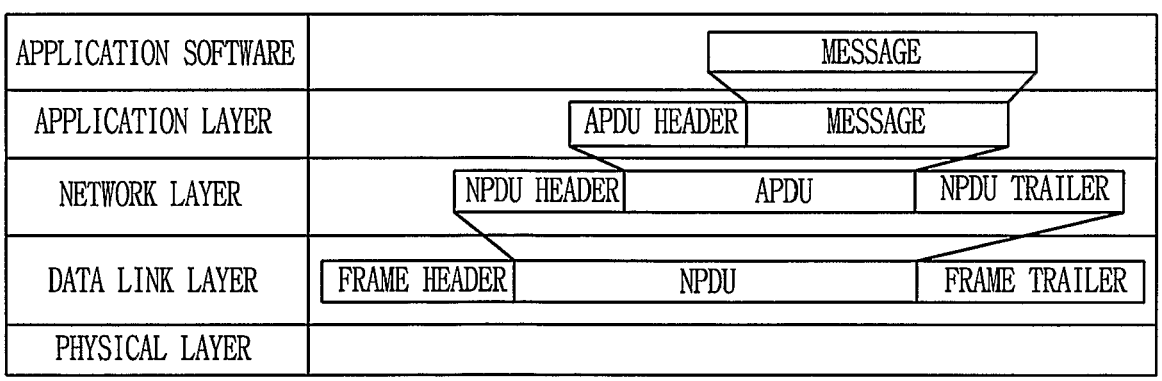

FIGS. 3 and 4 are structure views illustrating interfaces between the layers of FIG. 2, respectively.

FIG. 3 illustrates the interfaces between the layers when the physical layer 90 is connected to the non-independent transmission medium, and FIG. 4 illustrates the interfaces between the layers when the physical layer 90 is connected to the independent transmission medium.

The home network system 1 adds headers and trailers required by each layer to protocol data units (PDU) from the upper layers, and transmit them to the lower layers.

As shown in FIGS. 3 and 4, an application layer PDU (APDU) is a data transmitted between the application layer 60 and the network layer 70, a network layer PDU (NPDU) is a data transmitted between the network layer 70 and the data link layer 80 or the home code control sub-layer 71, and a home code control sub-layer PDU (HCNPDU) is a data transmitted between the network layer 70 (precisely, the home code control sub-layer 71) and the data link layer 80. The interface is formed in data frame units between the data link layer 80 and the physical layer 90.

FIGS. 5 to 10 are detailed structure views illustrating the interfaces of FIGS. 3 and 4, respectively.

Figure 5:
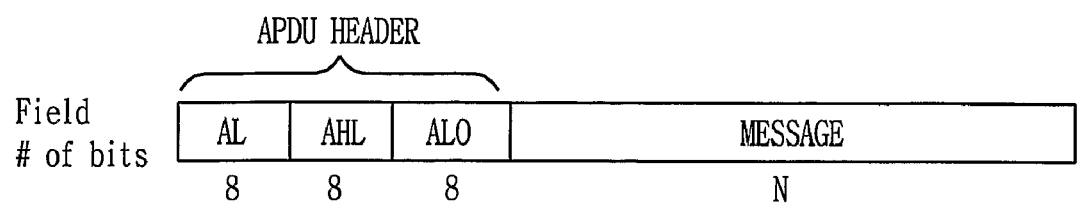
FIGS. 5 to 10 are detailed structure views illustrating the interfaces of FIGS. 3 and 4, respectively.

FIG. 5 illustrates the APDU structure in the application layer 60.

An APDU length (AL) field shows a length of the APDU (length from AL to message field), and has a minimum value of 4 and a maximum value of 77.

An APDU header length (AHL) field shows a length of an APDU header (length from AL to AL0), successfully has 3 bytes, and is extensible to 7 bytes. In the LnCP, the APDU header can be extended to 7 bytes to encode a message field and change an application protocol.

An application layer option (ALO) field extends a message set. For example, when the ALO field is set as 0, if the ALO field contains a different value, message processing is ignored.

The message field processes a control message from the user or event information, and is changed by the value of the ALO field.

Figure 6:
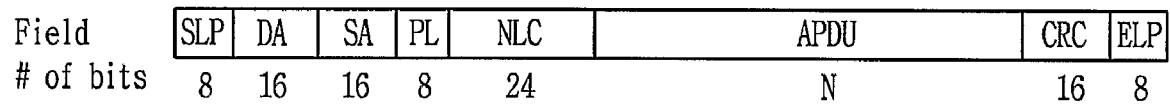
Figure 7:
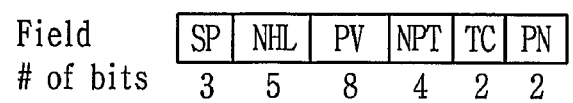

FIG. 6 illustrates the NPDU structure in the network layer 70, and FIG. 7 illustrates a detailed NLC structure of the NPDU.

A start of LnCP packet (SLP) field indicates start of a packet and has a value of 0x02.

Destination address (DA) and source address (SA) fields are node addresses of a receiver and a sender of a packet, and have 16 bits, respectively. The most significant 1 bit includes a flag indicating a group address, the succeeding 7 bits include a kind of a product (product code), and the lower 8 bits include a logical address for distinguishing the plurality of network managers 20 to 23 of the same kind and the plurality of electric devices 40 to 49 of the same kind. A packet length (PL) field shows the total length of NPDU which will be transferred, and its initial length is 15 bytes and its maximum length is 120 bytes.

A service priority (SP) field gives transmission priority to a transmission message and has 3 bits. Table 2 shows the priority of each transmission message.

When a slave device responds to a request of a master device, the slave device takes the priority of the request message from the master device.

TABLE 2

| Priority | Value | Message type |
|---|---|---|
| High | 0 | Security related message |
| Middle | 1 | When a normal packet is transmitted |
| | | When an event message for online or offline status change is transmitted |
| Normal | 2 | When a notification message for composing a network is transmitted |
| | | When a normal event message is transmitted |
| Low | 3 | When a data is transmitted by download or upload mechanism |

An NPDU header length (NHL) field extends an NPDU header (NLC field of SLP), successfully has 9 bytes, and is extended to a maximum of 17 bytes.

A protocol version (PV) field indicates the employed protocol version and its length is 1 byte. The upper 4 bits show the version, and the lower 4 bits show the sub-version. Version and sub-version use HEX to show their values respectively.

A network layer packet type (NPT) field is a 4-bit field for distinguishing a kind of a packet in the network layer 70. The LnCP includes a request packet, a response packet and a notification packet. The NPT field of a master device must be set as the request packet or the notification packet, and the NPT field of a slave device must be set as the response packet or the notification packet. Table 3 shows NPT values by kinds of packets.

TABLE 3

| Explanation | Value |
| --- | --- |
| Request packet | 0 |
| reserved | 1~3 |
| Response packet | 4 |
| reserved | 5~7 |
| Notification packet | 8 |
| reserved | 9~12 |
| Reserved value for interface with the home code control sub-layer | 13~15 |

A transmission counter (TC) field is a 2 bit field which retransmits the request packet or repeatedly transfers notification packet in order to enhance the transmission success rate of the notification packet when a communication error occurs in the network layer 70, making it unable to transfer the request packet or response packet properly. Table 4 shows the range of the values of the TC field by the NPT values.

TABLE 4

| Kind of packet | Value (range) |
| --- | --- |
| Request packet | 1~3 |
| Response packet | 1 |
| Notification packet | 1~3 |

A packet number (PN) field consists of 2 bytes, and it is used with the TC to detect duplicated packets in the slave device, and it is used to deal with multiple communication cycles in the master device. Table 5 shows the range of the values of the PN field by the NPT values.

TABLE 5

| Kind of packet | Value (range) |
| --- | --- |
| Request packet | 0~3 |
| Response packet | Copy a PN field value of a request packet |
| Notification packet | 0~3 |

An APDU field is a protocol data unit of the application layer 60 transmitted between the application layer 60 and the network layer 70. The APDU field has a minimum value of 0 byte and a maximum value of 88 bytes.

A cyclic redundancy check (CRC) field is a 16-bit field for checking an error of a received packet (from SLP to APDU).

An end of LnCP packet (ELP) field is the end of the packet with the value 0x03. If the ELP field is not detected in spite of byte length of the received data is the same with the value of packet's length field, this packet will be considered as an error packet.

Figure 8:
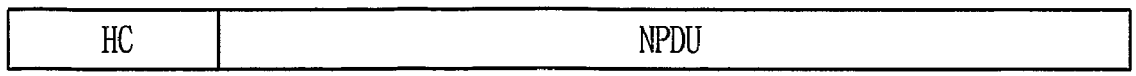

FIG. 8 illustrates the HCNPDU structure in the home code control sub-layer 71.

As depicted in FIG. 8, a home code (HC) field is added to the upper portion of the NPDU.

The home code is comprised of 4 bytes, and has a unique value within the line distance where a packet can be transmitted.

Figure 9:

FIG. 9 illustrates a frame structure in the data link layer 80.

The structure of the header and the trailer of the data link layer frame of the LnCP is changed according to transmission media. When the data link layer 80 uses a non-standardized transmission medium, the header and the trailer of the frame must have null fields, and when the data link layer 80 uses a standardized transmission medium, the header and the trailer of the frame are formed as prescribed by the protocol. An NPDU field is a data unit transmitted from the upper network layer 70, and an HCNPDU field is a data unit obtained by adding 4 bytes of home code to the front portion of the NPDU, when the physical layer 90 is a dependent transmission medium such as a power line or IEEE 802.11. The data link layer 80 processes the NPDU and the HCNPDU in the same manner.

Figure 10:
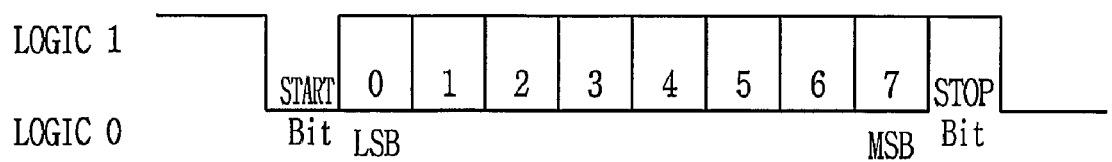

FIG. 10 illustrates a frame structure in the physical layer 90.

The physical layer 90 of the LnCP handles a function of transmitting and receiving a physical signal to a transmission medium. The data link layer 80 can use a non-standardized transmission medium such as RS-485 or small output RF or a standardized transmission medium such as a power line or IEEE. 802.11 as the physical layer 90 of the LnCP. The home network system 1 using the LnCP employs a universal asynchronous receiver and transmitter (UART) frame structure and a signal level of RS-232, so that the network managers 20 to 23 and the electric devices 40 to 49 can interface with RS-485, the LnCP routers 30 and 31 or the LnCP adapters 35 and 36. When the UART is connected between the devices by using a serial bus, the UART controls flow of bit signals on a communication line. In the LnCP, a packet from the upper layer is converted into 10 bits of UART frame unit as shown in FIG. 10, and transmitted through the transmission medium. The UART frame includes one bit of start bit, 8 bits of data and one bit of stop bit without any parity bit. The start bit is transmitted first, followed by data bits and the stop bit. When the home network system 1 using the LnCP employs the UART, it does not have additional frame header and frame trailer. The node parameters used in the aforementioned layers will now be explained.

Data types of the node parameters mentioned below correspond to one of a few data types of Table 6.

TABLE 6

| Notation | Data type | Description |
| --- | --- | --- |
| char | signed char | 1 byte when data length is not stated |
| uchar | unsigned char | 1 byte when data length is not stated |
| int | signed int | 2 bytes when data length is not stated |
| uint | unsigned int | 2 bytes when data length is not stated |
| long | signed long | 4 bytes when data length is not stated |
| ulong | unsigned long | 4 bytes when data length is not stated |
| string | string | A character string data where the last byte is NULL |
| FILE | — | A data having a file structure |

First, the application layer 60 generates a message and an APDU by using information or a command transmitted from the user through the application software 50, transmits the message and the APDU to the lower network layer 70, interprets an APDU from the lower network layer 70, and transmits the APDU to the application software 50.

Table 7 shows node parameter values used in the application layer 60.

TABLE 7

| Name | Type | Explanation |
| --- | --- | --- |
| Transmission interval between address request messages | constant uint AddressReqInt | A logical address value is received from the network layer 70 directly after power on. When the value is 0x00, an address request message is consecutively transmitted at an interval of AddressReqInt seconds until an address is designated. |
| Transmission interval between active event messages | uint NP__AliveInt | When a logical address of the network layer 70 is not 0x00, an active event message is consecutively transmitted at an interval of NP__AliveInt seconds in a network connection status. |
| Buffer size | uchar NP__BufferSize | A size of a buffer containing a message (unit is byte number) |
| Service timeout | const uint SvcTimeOut | A time taken for the application layer 60 to receive a request message sending primitive RegMsgSend, 30 seconds |
| Transmission interval between download request messages | const unit DLInterval | the interval time that the download service will be regarded as a failure, if other download request messages can not be received by the slave device's application layer after it received a download request message |

The network layer 70 performs the following functions.

First, the network layer 70 performs an address management function, namely stores its address and an address of the destination network manager 20 to 23 or the destination electric device 40 to 49. Here, the network layer 70 can designate a cluster address by using information and location information of the network manager 20 to 23 or the electric device 40 to 49 included in the address, and support multicasting and broadcasting communication.

Second, the network layer 70 performs a flow control function, namely manages a communication cycle and controls flow of a packet.

Third, the network layer 70 performs an error control function. That is, when the network layer 70 does not receive a response packet within a set time, the network layer 70 retries a data. A retry count is maximally 3.

Fourth, the network layer 70 performs a transaction control function, namely prevents duplicate transaction of the same message by checking a duplicate packet, and controls simultaneous communication cycles.

Fifth, the network layer 70 performs a routing control function, namely transmits a packet between at least two independent transmission media, and controls flow of a packet to prevent an infinite loop between the LnCP routers 30 and 31 and the LnCP adapters 35 and 36.

The network layer 70 provides services in communication cycle units. The communication cycles are classified into {1-Request, 1-Response}, {1-Request, Multi-Responses}, {1-Notification} and {Repeated-Notification}.

In the {1-Request, 1-Response} communication cycle, one master device transmits one request packet to one slave device, and the slave device transmits one response packet to the master device as a response.

In the {1-Request, Multi-Responses} communication cycle, one master device transmits one request packet to a plurality of slave devices, and each of the slave devices sequentially transmits a response packet to the request packet.

In the {1-Notification} communication cycle, a (master or slave) device transmits one notification packet to one or a plurality of (master or slave) devices, and directly ends communication.

In the {Repeated-Notification} communication cycle, in order to obtain transmission reliability of the {1-Notification} communication cycle, the same packet is repeatedly transmitted and communication is ended.

Table 8 shows relations among the aforementioned communication cycles, packet types and transmission services (or network layer services).

TABLE 8

| Communication cycle | Packet type | NL service |
| --- | --- | --- |
| {1-Request, 1-Response} | Request packet-Response packet | Acknowledged(0) |
| {1-Request, Multi-Responses} | Request packet-Response packet | Acknowledged(0) |
| {1-Notification} | Notification packet | Non-Acknowledged(1) |
| {Repeated-Notification} | Notification packet | Repeated-Notification(2) |

Figure 11:
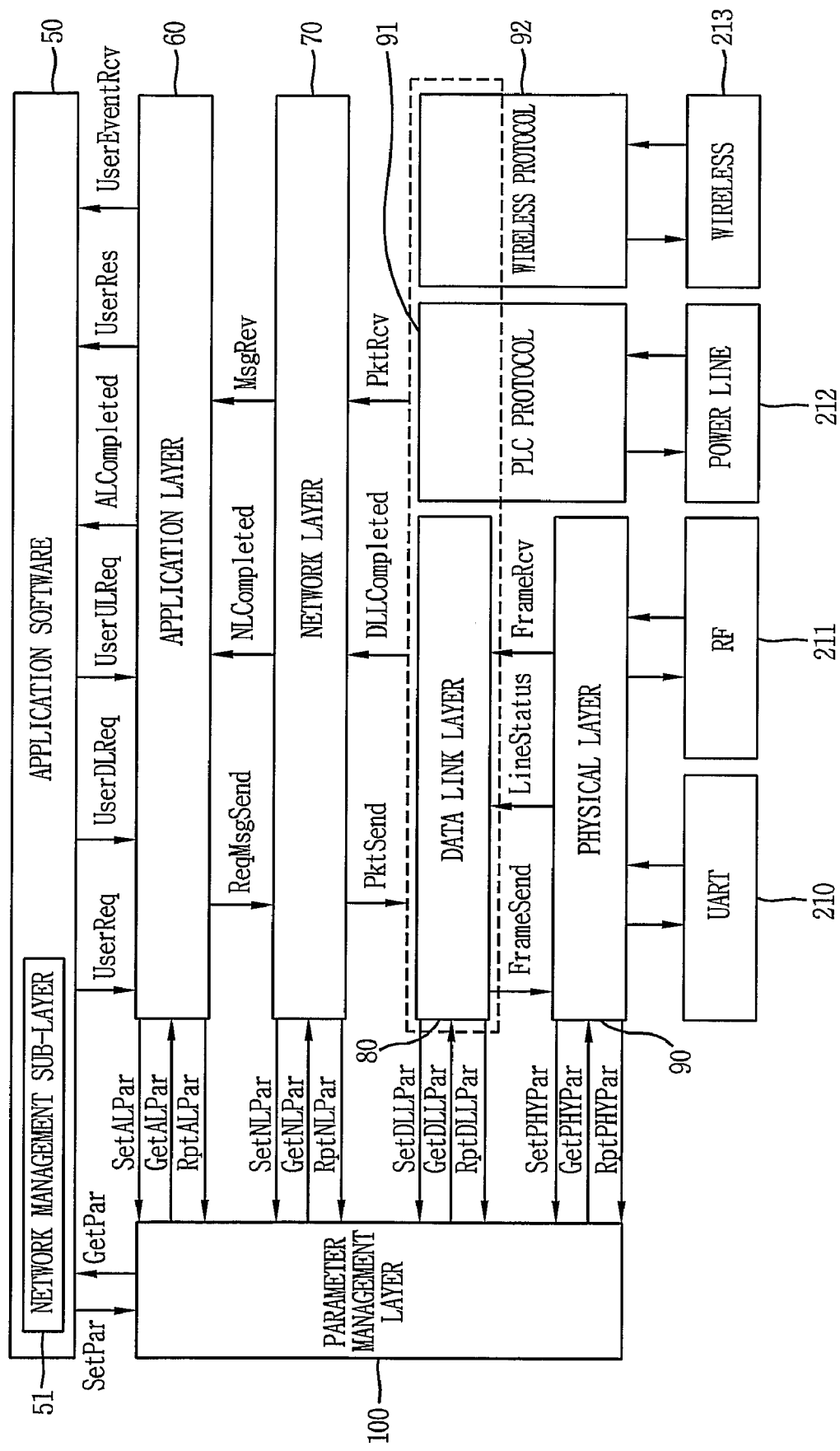
FIGS. 11 and 12 are structure views illustrating primitives for transmitting data exchanged between the layers.
Figure 12:
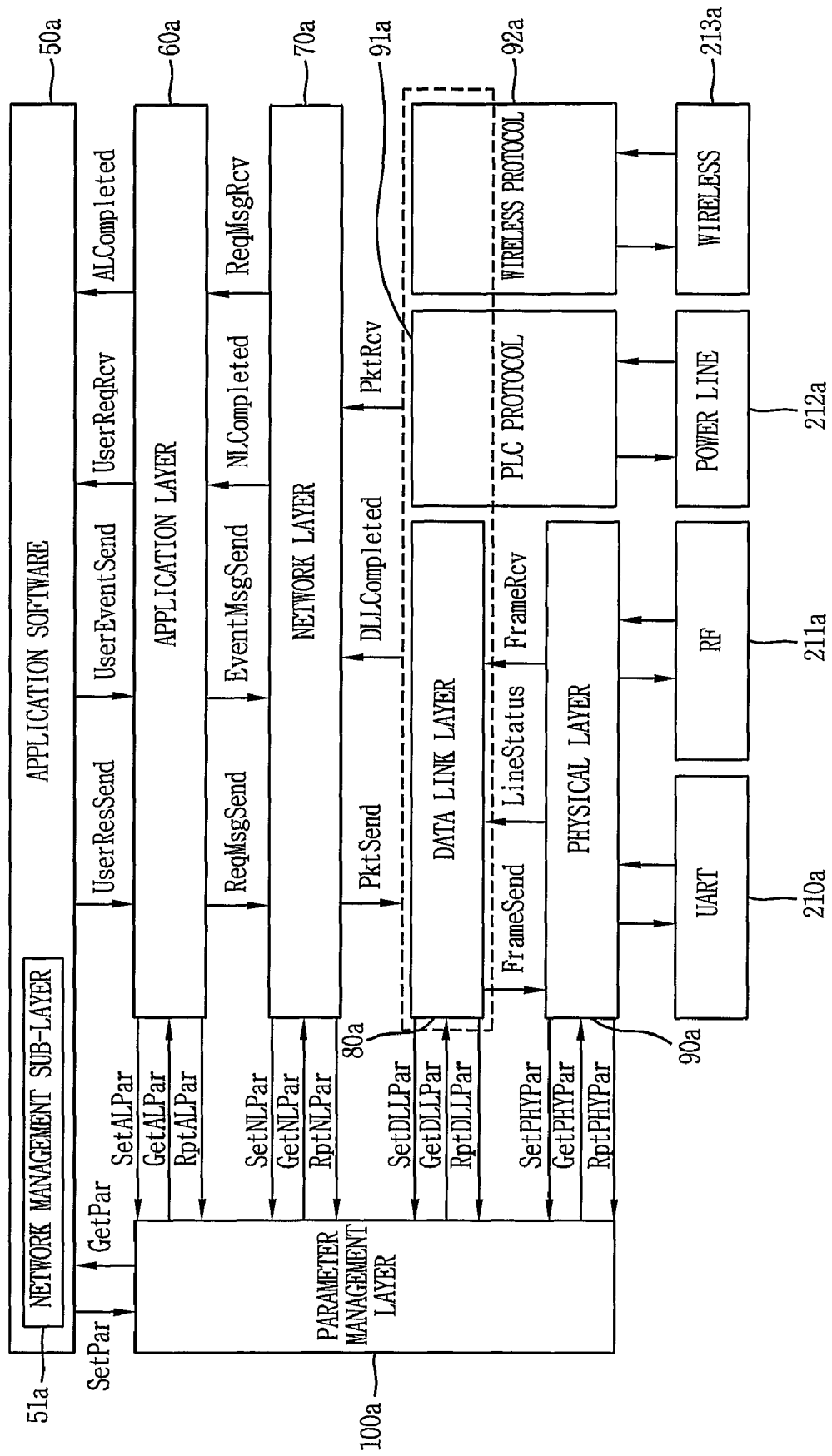

FIGS. 11 and 12 are structure views illustrating primitives for transmitting data exchanged between the layers.

FIG. 11 illustrates transmission of the primitives between the layers of the master device.

As shown in FIG. 11, the primitives between the application software 50 and the application layer 60 include UserReq, UserDLReq, UserULReq, ALCompleted, UserRes and UserEventRcv.

The user request primitive UserReq is a service request primitive formed by a single communication cycle from the application software 50 of the master device, and used for controlling or monitoring. The user request primitive UserReq includes constitutional elements of Table 9A.

TABLE 9A

| Name | Type | Description |
| --- | --- | --- |
| Application service code | ulong ALSvcCode | An application service code of the application layer 60, combination of a product code and a command code |
| Request message | RequestMessage *ReqMsg | A request message including a command code and input arguments |
| Length of request message | uchar ReqMsgLength | A byte data length of a request message |
| Designation address | uint DstAddress | An address of a receiver device |
| Network layer service | uchar NLService | Transmission service types in the network layer 70<br>0: Request-response-message<br>1: Request-message-only<br>2: Repeated-message<br>3: Event-message-only |

TABLE 9A-continued

| Name | Type | Description |
| --- | --- | --- |
| Timeout | uint TimeOut | When an AL service is Request-response-message, a time (ms) taken for a master device to transmit a request packet and receive a response packet, or when the AL service is Repeated-message, a time interval (ms) between consecutive messages |
| Service priority | uchar SvcPriority | Transmission priority in the data link layer 80 |

In an application layer service (AL service), Request-response-message is combination of a request message and a response message. Here, the master device transmits the request message, and the slave device receiving the request message always transmits the response message. In Request-message-only, only a request message is provided. Here, the slave device receiving the request message does not transmit a response message. In Repeated-message, only a request message or only an event message is consecutively provided. Here, the slave device does not transmit a response message. In Event-message-only, only an event message is provided. Here, the slave device does not transmit a response message.

The user download request primitive UserDLReq is a download service request primitive transmitted from the application software 50 of the master device, and includes constitutional elements of Table 9B.

TABLE 9B

| Name | Type | Description |
| --- | --- | --- |
| Application service code | ulong ALSvcCode | An application service code of the application layer 60, combination of a product code and a command code |
| Download file | FILE *DownloadFile | A file having download data |
| Application layer service | uchar ALService=0 | A transmission service type fixed to Request-response-message(0) |
| Destination address | uint DstAddress | An address of a receiver device |
| Timeout | uint TimeOut | A time (ms) taken for a master device to transmit a request packet and receive a response packet |
| Service priority | uchar SvcPriority | Transmission priority in the data link layer 80 fixed to 1 |

The user upload request primitive UserULReq is an upload service request primitive transmitted from the application software 50 of the master device, and includes constitutional elements of Table 9C.

TABLE 9C

| Name | Type | Description |
| --- | --- | --- |
| Application service code | ulong ALSvcCode | An application service code of the application layer 60, combination of a product code and a command code |
| Upload file | FILE *UploadFile | A file name for storing upload data |
| Application layer service | uchar ALService | A transmission service type fixed to Request-response-message(0) |
| Destination address | uint DstAddress | Address of a receiver device |
| Timeout | uint TimeOut | A time (ms) taken for a master device to transmit a request packet and receive a response packet |
| Service priority | uchar SvcPriority | Transmission priority in the data link layer 80 fixed to 1 |

The user response primitive UserRes is a primitive for transmitting a service execution result of the master device to the application software 50, and includes constitutional elements of Table 9D.

TABLE 9D

| Name | Type | Description |
| --- | --- | --- |
| Application service code | ulong ALSvcCode | An application service code of the application layer 60, combination of a product code and a command code |
| Response message | ResponseMessage *ResMsg | A response message having a command code and return arguments |
| Length of response message | uchar ResMsgLength | A byte data length of a response message |
| Source address | uint SrcAddress | An address of a sender device |

The user event receiving primitive UserEventRcv is an event service primitive transmitted to the application software 50 of the master device, and includes constitutional elements of Table 9E.

TABLE 9E

| Name | Type | Description |
| --- | --- | --- |
| Application service code | ALSvcCode | An application service code of the application layer 60, combination of a product code, a command code and an event code |
| Event message | EventMesage *EventMsg | An event message from a slave device |
| Length of event message | uchar EventMsgLength | A byte data length of a response message |
| Source address | uint SrcAddress | An address of a sender device |

The application layer completing primitive ALCompleted is a primitive for transmitting an execution result of the application layer 60 of the master device to the application software 50, and includes constitutional elements of Table 9F.

TABLE 9F

| Name | Type | Description |
|---|---|---|
| Application service code | ulong ALSvcCode | An application service code of the application layer 60, combination of a product code and a command code |
| Service result | uchar ALResult | If the application software finishes the requested service successfully, the value will be SERVICE_OK(1), if not, it will be SERVICE_FAILED(0) |
| Failure reason code | uchar ALFailCode | when the ALResult is SERVICE_FAILED, the value of the reason of failure |

Still referring to FIG. 11, the primitives between the application layer 60 and the network layer 70 include ReqMsgSend, NLCompleted and MsgRev.

The request message sending primitive ReqMsgSend is a primitive for transmitting a message from the application layer 60 of the master device to the network layer 70, and includes constitutional elements of Table 10A.

TABLE 10A

| Name | Type | Explanation |
|---|---|---|
| Communication cycle identifier | ulong CycleID | An ID number of a communication cycle in a master device |
| Request message | uchar *ReqAPDU | An APDU including a request message created in the application layer 60 of a master device |
| Length of request message | uchar APDULength | A byte data length of an APDU |
| Destination address | uint DstAddress | An address of a receiver device |
| Source address | uint SrcAddress | An address of a sender device |
| Network layer service | uchar NLService | Communication cycle service types of a master device 0: Acknowledged, 1: Non-acknowledged, 2: Repeated-notification |
| Response timeout | uchar responseTimeOut | When an NL service is chosen as Acknowledged, a time (ms) taken for a master device to transmit a request packet and receive a response packet |
| Transmission interval between repeated notification packets | uint RepNotiInt | When an NL service is selected as Repeated-notification, a time interval (ms) between consecutive notification packets |
| Service priority | uchar SvcPriority | Transmission priority of a request message |

Here, the communication cycle identifier CycleID is generated by combining the application service code ALSvcCode and the node address of the receiver device.

The message receiving primitive MsgRcv is a primitive for transmitting a packet from the network layer 70 of the master device to the application layer 60, and includes constitutional elements of Table 10B.

TABLE 10B

| Name | Type | Description |
|---|---|---|
| Communication cycle identifier | ulong CycleID | An ID number of a communication cycle in a master device |
| Event response message | uchar *ResEventAPDU | An APDU transmitted to the application layer 60 |
| Length of event response message | uchar APDULength | A byte data length of an APDU |
| Destination address | uint DstAddress | An address of a receiver device |
| Source address | uint SrcAddress | An address of a sender device |

The structure of the communication cycle identifier CycleID will later be explained.

The network layer completing primitive NLCompleted is a primitive for notifying a packet processing status from the network layer 70 to the application layer 60, and includes constitutional elements of Table 10C.

TABLE 10C

| Name | Type | Description |
|---|---|---|
| Communication cycle identifier | ulong CycleID | An ID number of a communication cycle in a master device |
| transmission result | uchar NLResult | If communication cycle is completed successfully, the value will be CYCLE_OK(1), if not, it will be CYCLE_FAILED(0) |
| Failure reason code | uchar NLFailCode | The classified value of the reason of failure when the value of the NLResult is CYCLE_FAILED |
| Retry count | uchar NLSuccessCode | The number of retransmission times when the value of the NLResult is CYCLE_OK |

The primitives among the rest of the layers will not be explained.

FIG. 12 illustrates transmission of the primitives between the layers of the slave device.

First, the primitives between the application software 50a and the application layer 60a include UserReqRcv, UserResSend and UserEventSend.

The user request receiving primitive UserReqRcv is a primitive for transmitting a request message (including download and upload) from the master device to the application software 50a of the slave device, and includes constitutional elements of Table 11A.

TABLE 11A

| Name | Type | Description |
|---|---|---|
| Application service code | ulong ALSvcCode | A service code of the application layer 60a, combination of a product code and a command code |
| Request data | uchar *ReqData | A data included in a request message from a master device |
| Length of request data | uchar ReqDataLength | A length (byte) of a request data |
| Source address | uint SrcAddress | Address of a sender device |

The user response sending primitive UserResSend is a primitive for transmitting a response message to a request message of the master device to the application layer 60a of the slave device, and includes constitutional elements of Table 11B.

TABLE 11B

| Name | Type | Description |
| --- | --- | --- |
| Application service code | ulong ALSvcCode | A service code of the application layer 60a, combination of a product code and a command code |
| Response data | uchar *ResData | A data included in a response message transmitted to a master device |
| Length of response data | uchar ResDataLength | A byte length of ResData |

The user event sending primitive UserEventSend is a primitive for transmitting to the application layer 60a a status variable value of an event message of the slave device intended to be transmitted to the master device, and includes constitutional elements of Table 11C.

TABLE 11C

| Name | Type | Description |
| --- | --- | --- |
| Application service code | uchar ALSvcCode | A service code of the application layer 60a, combination of a product code, a command code and an event code |
| Application layer service | uchar ALService | Transmission service types 2: Repeated-message, 3. Event-message-only |
| Event code | uint EventCode | An event code |
| Status variable value | uchar *StateValue | A status variable value of an event message |

Still referring to FIG. 12, the primitives between the application layer 60a and the network layer 70a include ReqMsgRcv, ResMsgSend, EventMsgSend and NLCompleted.

The request message receiving primitive ReqMsgRcv is a primitive for transmitting a received request message from the network layer 70a to the application layer 60a, and includes constitutional elements of Table 12A.

TABLE 12A

| Name | Type | Description |
| --- | --- | --- |
| Request message | uchar *ReqAPDU | An APDU transmitted to the application layer 60a |
| Length of request message | uchar APDULength | A byte data length of an APDU |
| Destination address | uint DstAddress | An address of a receiver device |
| Source address | uint SrcAddress | An address of a sender device |
| Network layer service | uchar NLService | Communication cycle service types of a slave device 0: Acknowledged, 1: Non-acknowledged |
| Duplicate packet check result | uchar DuplicateCheck | If there is no duplicate packet, it will be NORMAL_PKT(1), if not, it will be DUPLICATED_PKT(0) |

The response message sending primitive ResMsgSend is a primitive for transmitting a response message from the application layer 60a to the network layer 70a, and includes constitutional elements of Table 12B.

TABLE 12B

| Name | Type | Description |
| --- | --- | --- |
| Communication cycle identifier | uiong CycleID | An ID number of a communication cycle in a slave device |

TABLE 12B-continued

| Name | Type | Description |
| --- | --- | --- |
| Response message | uchar *ResAPDU | An APDU including a response message generated in the application layer 60 of a slave device |
| Length of response message | uchar APDULength | A byte data length of an APDU |

The event message sending primitive EventMsgSend is a primitive for transmitting an event message from the application layer 60a to the network layer 70a, and includes constitutional elements of Table 12C.

TABLE 12C

| Name | Type | Description |
| --- | --- | --- |
| Communication cycle identifier | ulong CycleID | An ID number of a communication cycle in a slave device |
| Event message | uchar *EventAPDU | An APDU including an event message generated in the application layer 60 of a slave device |
| Length of event message | uchar APDULength | A byte data length of an APDU |
| Destination address | uint DstAddress | Address of a receiver device |
| Source address | uint SrcAddress | Address of a sender device |
| Network layer service | uchar NLService | Transmission services in the network layer 70a 1: Non-acknowledged, 2: Repeated-notification |
| Transmission interval between repeated notification messages | uchar RepNotiInt | When an NL service is chosen as Repeated-notification, a interval time(ms) between consecutive notification packets |
| Service priority | uchar SvcPriority | Transmission priority of an event message |

The network layer completing primitive NLCompleted is a primitive for notifying a packet processing status from the network layer 70a to the application layer 60a, and includes constitutional elements of Table 12D.

TABLE 12D

| Name | Type | Description |
| --- | --- | --- |
| Communication cycle identifier | ulong CycleID | An ID number of a communication cycle in a slave device |
| Transmission result | uchar NLResult | If communication cycle is completed successfully, the value will be CYCLE_OK(1), if not, it will be CYCLE_FAILED(0) |
| Failure reason code | uchar NLFailCode | The classified value of the reason of failure when the value of the NLResult is CYCLE_FAILED |
| Retry count | uchar NLSuccessCode | The number of retransmission times when the value of the NLResult is CYCLE_OK |

The primitives among the rest of the layers will not be explained.

According to the byte (or bit) data layout on the message, the upper byte (or bit) of the data is located on the left side of the message, whereas the lower byte (or bit) of the data is located on the right side of the message. The application layers 60 and 60a handle the messages described below.

Request Message: A message of command execution to be performed in a slave device, which is transferred from the application layer 60 to the network layer 70 of a master device, or from the network layer 70a to the application layer 60a of the slave device. According to transmission mode from the network layer 70a, the application layer 60a of the slave device can send a response message (to be described);

Response Message: A message conveying a result of command execution in a slave device, which is transferred from the network layer 70 to the application layer 60 of a master device, or from the application layer 60a to the network layer 70a of a slave device. This message is sent in response to the request message; and Event Message: A message conveying a change in a device status, which is transferred from the application layer to the network layer (in case of a sended side), or from the application layer to the network layer (in case of a receiving side). The receiving side does not response to this message.

FIGS. 13 to 15 illustrate structures of request messages, respectively.

FIG. 13 shows a basic request message composed of a command code CC and arguments arg1, arg2, . . . . As a rule, a request message is sent to control a device, check a device status, and check the information of a device.

FIG. 14 shows a downloading request message including a total page TotalPage field and a current page CurrentPage field as input arguments for partitioning data and transmitting it to a device. FIG. 15 shows an uploading request message including a page number PageNo and a data size DataNo as input arguments for partitioning and acquiring data from a device.

In detail, the downloading request message is sent when a master device with a predetermined data wants to transmit the data to a slave device and/or another master device. The data is partitioned in predetermined data size, and the total number of the partitioned data becomes the total page, and a particular page included in a current request message and transmitted becomes the current page.

The uploading request message is sent when a master device wants to upload data retained in a slave device and/or another master device. The master device requests part of data in corresponding size, and this partial data becomes a partitioned data in a corresponding page number.

Figures 16, 17, 18, 19:
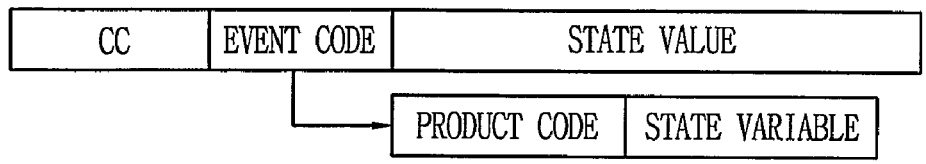
FIGS. 16 to 19 illustrates structures of response messages, respectively.

FIGS. 16 to 18 illustrates structures of response messages, respectively.

There are two main types of response messages: ACK-response messages that are generated if a request from a master device is successfully executed, and NAK-response messages that are generated if the request fails.

FIG. 16 shows the structure of an ACK-response message. As can be seen in the drawing, the ACK-response message consists of a command code CC, an ACK (for example, 0x06), and arguments (arg1, arg2, . . . ) indicating a result of request execution. The ACK-response message is transmitted when a slave device sends successfully executes a request from a master device.

FIG. 17 shows the structure of a NAK-response message. As can be seen in the drawing, the NAK-response message consists of a command code CC, a NAK (for example, 0x15), and 1-byte NAK_code. The NAK-response message is transmitted when a slave device failed to execute a request from a master device. The NAK_code should be distinguished from an error related to product operation failure, which is a code value classifying a reason for request failure particularly due to an incorrect command code or incorrect argument during the communication process between a master device and a slave device.

FIG. 18 shows a NAK-response message including an error code Error_code. The error code Error_code is an error related to production operations. If a slave device fails to execute a request mainly because of this type of error, the NAK_code value is fixed to a predetermined value, say, for example '0x63', and an Error_code value follows the NAK_code.

FIG. 19 illustrates a structure of an event message.

An event message is generated when a device status is changed. As can be seen in the drawing, the event message consists of a command code (such as, 0x11), an event code of 2 bytes, and a state value of 4 bytes. In the event code, an upper byte indicates a product code, and a lower byte indicates a state variable.

Figure 20:
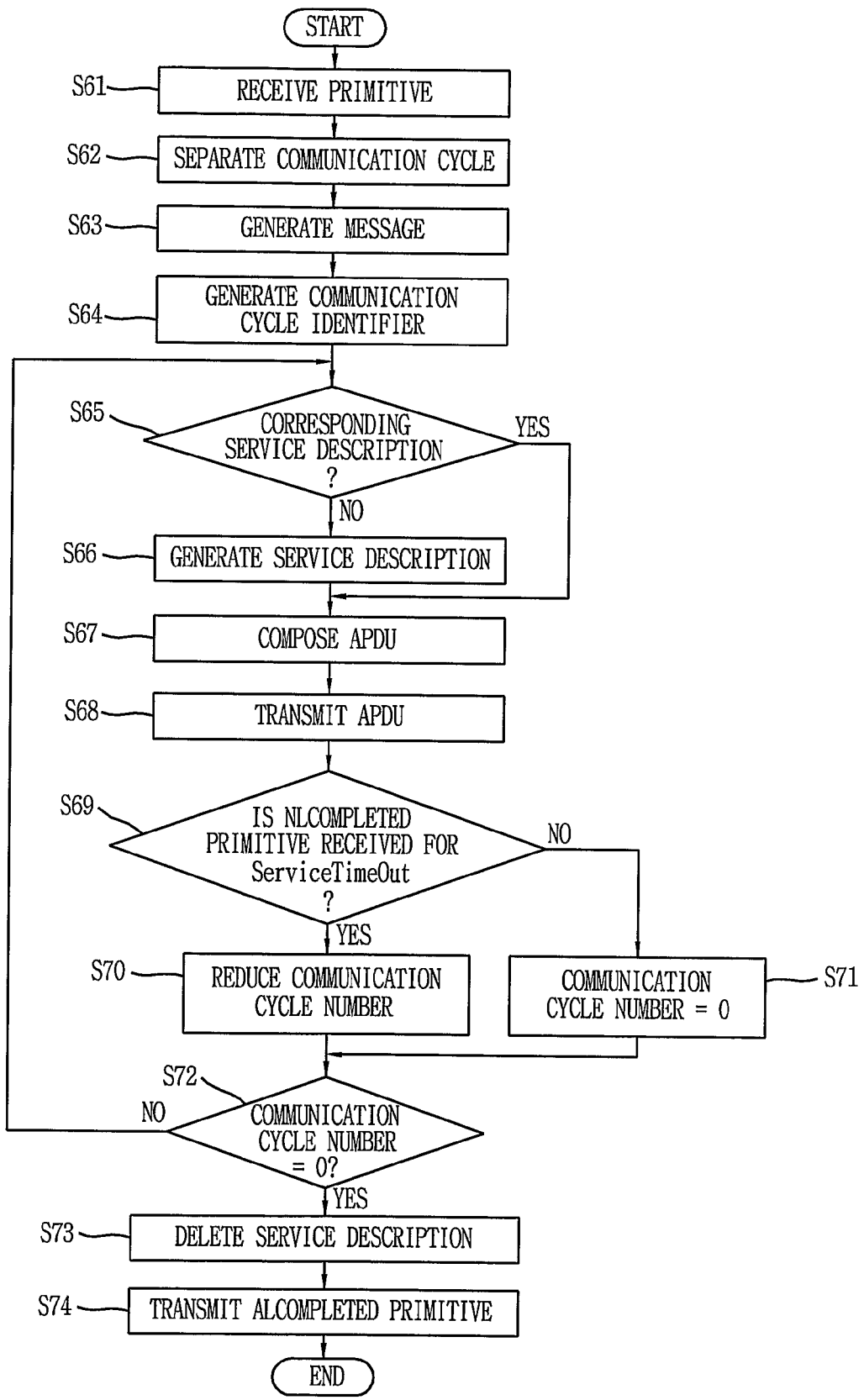
FIG. 20 is a flow chart for explaining a data processing method for application layer in accordance with a first embodiment of the present invention.

FIG. 20 is a flow chart for explaining a data processing method for application layer in accordance with a first embodiment of the present invention. To be brief, the application layer 60 of a master device receives a predetermined primitive from the application software 50, composes an APDU, and transmits the APDU to the network layer 70.

Now referring to FIG. 20, in step S61, the application layer 60 of a master device receives a user request primitive UserReq, a user download request primitive UserDLReq, or a user upload request primitive UserULReq.

In step S62, since the service specified in the application layer service code ALSvcCode included in the user request primitive UserReq is formed of a single communication cycle, the application layer 60 of the master device separates the single communication cycle for processing.

Similarly, since the service specified in the application layer service code ALSvcCode included in the user download request primitive UserDLReq or in the user upload request primitive UserULReq is formed of a plurality of communication cycles CycleNo, the application layer 60 of the master device separates the communication cycles CycleNo into single-communication cycles and processes each communication cycle consecutively, so that the entire communication cycles CycleNo can be processed.

In step S63, the application layer 60 of the master device generates a request or notification message in order to execute the service formed of a single communication cycle of the user request primitive UserReq. Meanwhile, the application layer 60 of the master device generates a plurality of request messages (the number of request messages generated corresponds to the number of partitioned data out of a predetermined data) according to the download or upload procedure in order to execute the service formed of a plurality of communication cycles CycleNo of the user download request primitive UserDLReq or the user upload request primitive UserULReq.

In step S64, the application layer 60 of the master device generates a communication cycle identifier CycleID for the generated request or notification message. In effect, the application layer 60 of the master device gives the same communication cycle identifier CycleID to the plurality of request messages (i.e., messages corresponding in CycleNo) of the user download request primitive UserDLReq or the user upload request primitive UserULReq, and consecutively executes the respective services formed of the single communication cycle. Hereinafter, the primitive(s) described in connection with FIG. 20 include the user request primitive UserReq, the user download request primitive UserDLReq, and the user upload request primitive UserULReq.

As shown in FIG. 22, the communication cycle identifier is a four-byte field consisting of a destination address DstAddress and a command code. That is, the application layer 60 of the master device generates a communication cycle identifier CycleID by combining the application layer service code ALSvcCode included in the primitive from the application software 50 and the destination address DstAddress.

Going back to FIG. 20, in step S65, because the application layer 60 of the master device cannot give the same communication cycle identifier CycleID until the communication cycle is complete, it searches a pre-stored service description (to be described) instead. If there is the same ID value as the new communication cycle identifier CycleID generated in step S64, the application layer 60 of the master device ignores the new communication cycle identifier CycleID, and proceeds directly to step S67, without generating any service description thereof.

In step S66, when the application layer 60 of the master device receives a primitive, it generates a service description having the structure shown in Table 13.

TABLE 13

| Variable | Size | Description |
| --- | --- | --- |
| ALSvcCode | 4 bytes | A service code of the application layer |
| ALSvcType | 1 byte | Service types at the application layer<br>0: Request-response-message<br>1: Request-message-only<br>2: Repeated-message<br>3: Event-message-only |
| CycleNo | 1 byte | A number of communication cycles for service execution |
| CycleID | 4 bytes | A Communication cycle identifier which is transmitted to the network layer with the APDU |

The following will now describe in greater detail how each of the variables in Table 13 is set.

Application layer service code ALSvcCode is set to an application layer service code ALSvcCode included in a primitive;

Application layer service type ALSvcType is set to an application layer service code included in a primitive, for example, '0' for request-response-message, '1' for a request-message-only, '2' for a repeated-message and '3' for an event-message-only;

Communication cycle number CycleNo is set to '1' in case of the user request primitive UserReq, and a corresponding value to partitioned messages (or data) in case of the user download request primitive UserDLReq or the user upload request primitive UserULReg; and Communication cycle identifier CycleID is set based on the node address and the application layer service code ALSvcCode.

In step S67 of FIG. 20, the application layer 60 of the master device composes an APDU by adding headers to the transmitting messages to the network layer 70. At this time, the value of a field in the header is set as follows.

AL=Number of bytes of a transmitting message+3;
AHL=3; and
ALO=0 (if there is no application layer option).

In step S68, the application layer of the master device transmits the APDU to the network layer 70 using the request message sending primitive ReqMsgSend.

The data processing method after step S69 performs the completion of the communication cycle and service involved.

In step S69, in order to decide whether the communication cycle has been completed, the application layer 60 of the master device decides if the network layer completing primitive NLCompleted has been transmitted from the network layer for the service time out SvcTimeOut since the service execution started. If yes, the application layer 60 of the master device decides that the communication cycle is completed and proceeds to step S70. In step S70, the application layer 60 of the master device reduces the communication cycle number CycleNo defined in the service description by a predetermined value (for example, '1'). On the other hand, if the network layer completing primitive NLCompleted is not transmitted for the service time out SvcTimeOut, the application layer 60 of the master device proceeds to step S71 and sets the communication cycle number CycleNo to '0'. For instance, sometimes the network layer completing primitive NLCompleted is not transmitted due to transmission error of the message or slave device failure. Aside from the above-described scheme, the application layer 60 can also decide whether or not the communication cycle is completed by checking a NAK response message. If the NAK response message is received, the data processing method proceeds to step S71 where the application layer 60 sets the communication cycle number CycleNo to '0'. This is performed because when the NAK response message is received in response to a service formed of a plurality of communication cycles (e.g., download and upload services), the entire service must be terminated.

In step S72, the application layer 60 of the master device decides whether the entire communication cycle is fully executed. For instance, when the communication cycle number CycleNo is '0', the application layer 60 of the master device regards that as service completion, and if not, the data processing method proceeds to step S65 or S67 for executing communication cycles for the remaining messages, so that a plurality of communication cycles CycleNo can be completed.

In step S73, the application layer 60 of the master device deletes a corresponding service description, and in step S74, the application layer 60 of the master device transmits the application layer completing primitive ALCompleted including a result of service execution to the application software 50.

Figure 21:
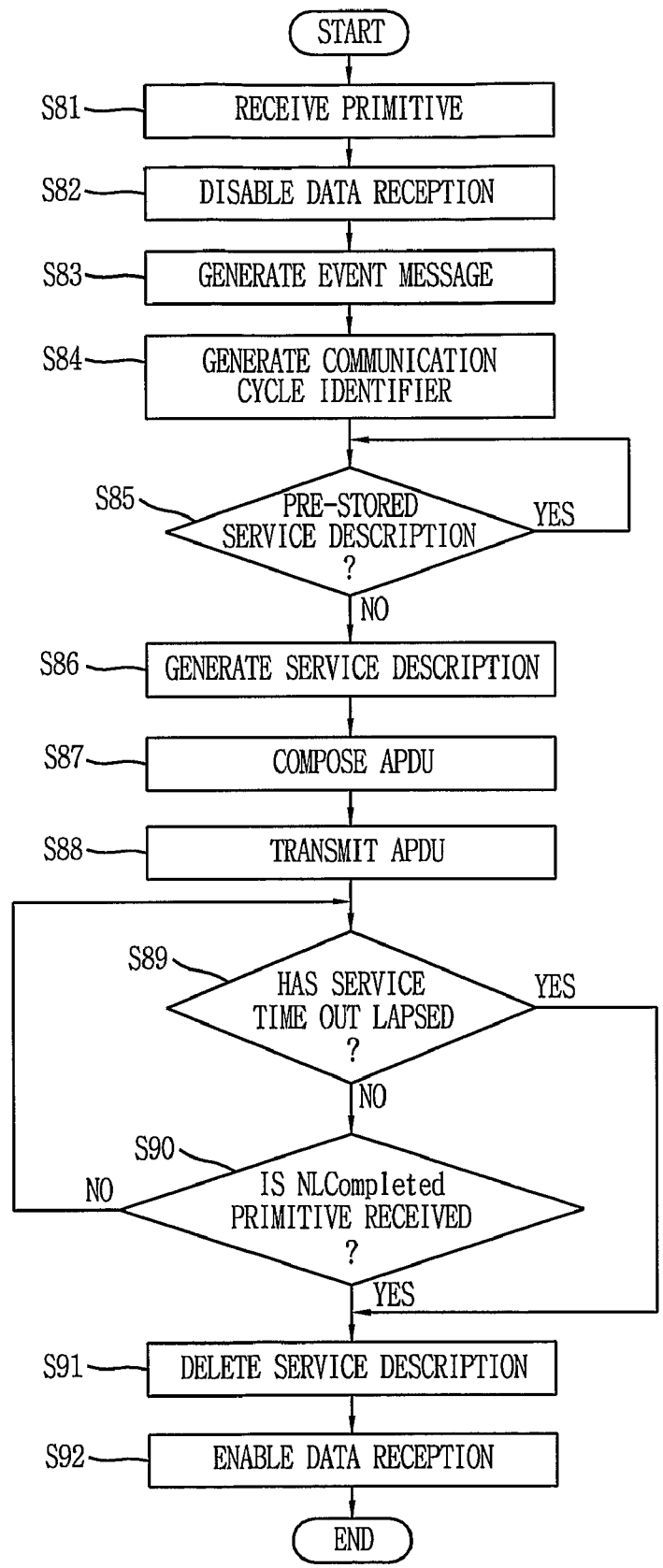
FIG. 21 is a flow chart for explaining a data processing method for application layer in accordance with a second embodiment of the present invention.

FIG. 21 is a flow chart for explaining a data processing method for application layer in accordance with a second embodiment of the present invention.

To sum up briefly, the application layer 60a of a slave device receives a predetermined primitive from the application software 50a, composes an APDU, and transmits the APDU to the network layer 70a.

In step S81, the application layer 60a of the slave device receives a user event send primitive UserEventSend from the application software 50a.

In step S82, the data reception function of the application layer 60a of the slave device is disabled, not to receive any data from the network layer 70a. Here, the data reception function can be enabled through a predetermined parameter (not shown) or a predetermined logic.

In step S83, the application layer 60a of the slave device composes and generates an event message which includes an event code EventCode and a state variable StateVariable included in the user event sending primitive UserEventSend.

In step S84, the application layer 60a of the slave device generates a communication cycle identifier based on a destination address (for example, 0xOOFF) of all master devices (i.e., network managers 20 to 23) and a command code (for example, 0x11) of an event message. Therefore, every communication cycle identifier CycleID generated by the user event sending primitive UserEventSend has the same value.

In step S85, since the application layer 60a of the slave device can process only one communication cycle at a time, if a pre-stored service description is currently being under way, it must wait until the service is completed and the service description is deleted.

In step S86, the application layer 60a of the slave device generates a service description having a similar structure shown in Table 13 as follows.

Application layer service code ALSvcCode is set to an application layer service code of the application layer ALSvcCode included in the user event sending primitive UserEventSend;

Application layer service type ALSvcType is set to the repeated-message (2) or the event-message-only (3);

Communication cycle number CycleNo is always fixed to '1'; and

Communication cycle identifier CycleID is fixed to '0x00FF0011' for example.

In step S87, the application layer 60a of the slave device composes an APDU including the event message that is generated in step S83, and in step S88, the application layer 60a of the slave device transmits the APDU to the network layer 70a using the event message sending primitive EventMsgSend.

The data processing method after step S89 performs the completion of the current communication cycle and service involved.

In step S89, the application layer 60a of the slave device decides whether the service time out SvcTimeOut has lapsed since the service execution started. If yes, the application layer 60a proceeds to step S91, and if not, the application layer 60a proceeds to step S90.

In step S90, the application layer 60a of the slave device decides whether the network layer completing primitive NLCompleted is transmitted from the network layer 70a. If not, the application layer 60a proceeds to step S89, and if yes, the application layer 60a proceeds to step S91.

In steps S89 and S90, although the service time out SvcTimeOut has not yet lapsed, if the network layer completing primitive NLCompleted is transmitted, the application layer 60a of the slave device may proceed to step S91. Of course, when the service time out SvcTimeOut lapses, the application layer 60a of the slave device always proceeds to step S91.

In step S91, the application layer 60a of the slave device deletes a service description, and in step S92, the data reception function of the application layer 60a of the slave device is enabled, being ready for receiving data from the network layer 70a.

Figure 23:
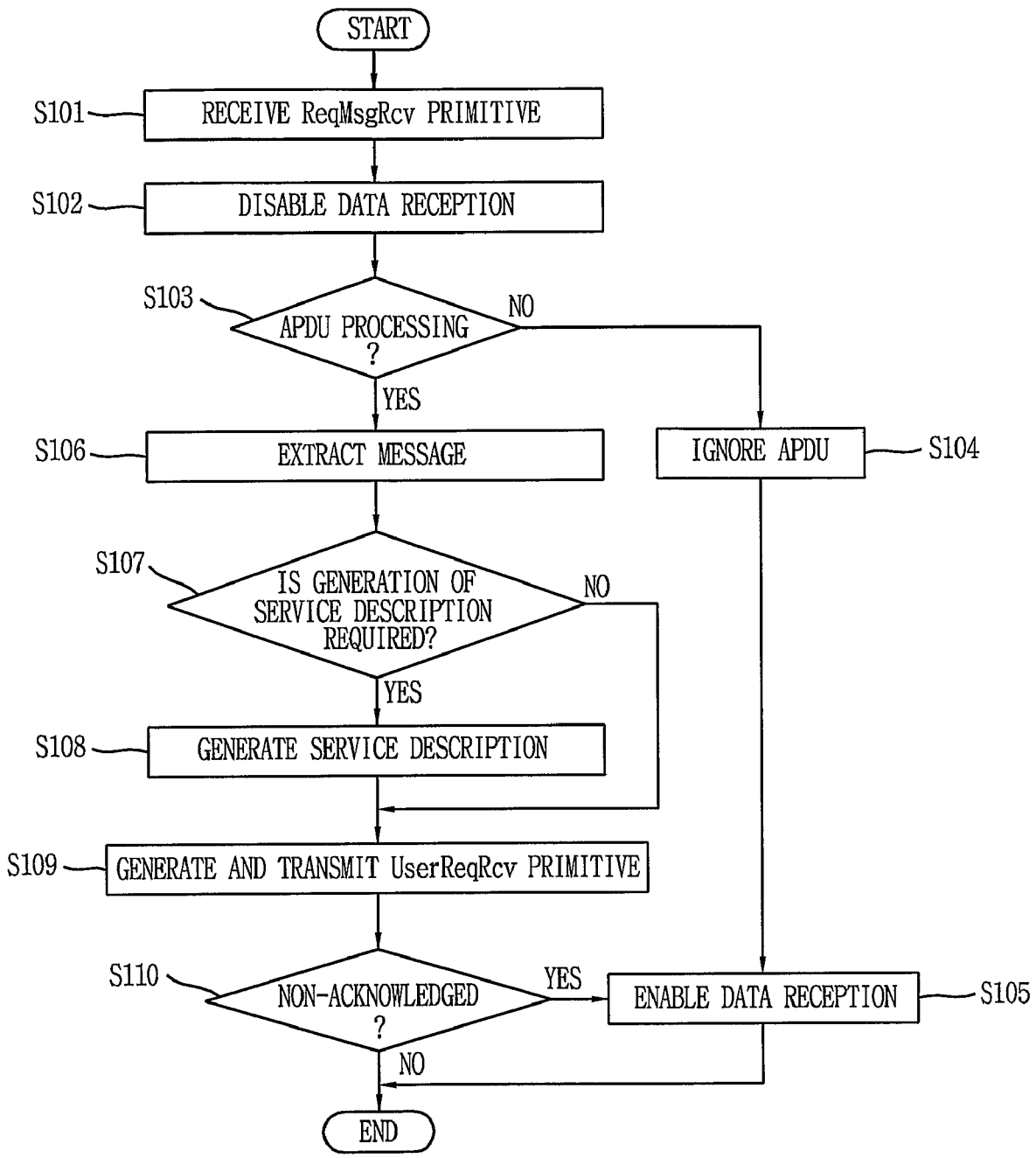
FIG. 23 is a flow chart for explaining a data processing method for application layer in accordance with a third embodiment of the present invention

FIG. 23 is a flow chart for explaining a data processing method for application layer in accordance with a third embodiment of the present invention. In short, the application layer 60a of a slave device receives a request message receiving primitive ReqMsgRcv from the network layer 70a, extracts a message, and transmits the message to the application software 50a.

In step S101, the application layer 60a of the slave device receives a request message receiving primitive ReqMsgRcv from the network layer 70a.

In step S102, the data reception function of the application layer 60a of the slave device is disabled, not to receive any data from the network layer 70a. Here, the data reception function can be accomplished through a predetermined parameter (not shown) or a predetermined logic.

In step S103, if ALO field value of an APDU included in the request message receiving primitive ReqMsgRcv from the network layer 70a is not equal to a predetermined value (for example, '0'), the application layer 60a of the slave device proceeds to step S104 and ignores the received APDU. Next, in step S105, the data reception function of the application layer 60a is enabled, being ready for receiving data.

In step S106, the application layer 60a of the slave device extracts a message from the APDU using the value of an AHL field. Even though a new field which is not defined may be added to the header of the received APDU, the application layer 60a of the slave device should be able to recognize it as the header by designated bytes for the AHL field, and extract the message therefrom.

In step S107, the application layer 60a of the slave device decides whether to generate a service description according to a network layer service NLService. When the network layer service NLService of a message included in the request message receiving primitive ReqMsgRcv is non-acknowledged (that is, an event or notification message), an additional operation (for example, the generation and transmission of a response message) is not required. Thus, the application layer 60a of the slave device may proceed to step S109, without generating a service description. However, when the network layer service NLService is acknowledge (that is, a request message), the application layer 60a of the slave device generates a service description having a similar structure shown in Table 13.

Application layer service code ALSvcCode includes a destination address DstAddress included in the request message receiving primitive ReqMsgRcv and a command code included in the extracted message;

Application layer service type ALSvcType is fixed to '0' (request-response);

Communication cycle number CycleNo is fixed to '1'; and

Communication cycle identifier CycleID is set or generated by combining the destination address DstAddress included in the request message receiving primitive ReqMsgRcv and the application layer service code ALSvcCode.

Thusly generated communication cycle identifier CycleID looks like one in FIG. 22.

Going back to FIG. 23, in step S109, the application layer 60a of the slave device generates a user request receiving primitive UserReqRcv including the extracted message, and transmits it to the application software 50a.

In step S110, the application layer 60a of the slave device decides whether the network layer service NLService included in the request message receiving primitive ReqMsgRcv is non-acknowledged. If so, the extracted message is transmitted to the application software 50a, and no additional operation (for example, the generation and transmission of a response message) is required. Thus, the data reception function of the application layer 60a is enabled, being ready for receiving data from the network layer 70a.

Figure 24:
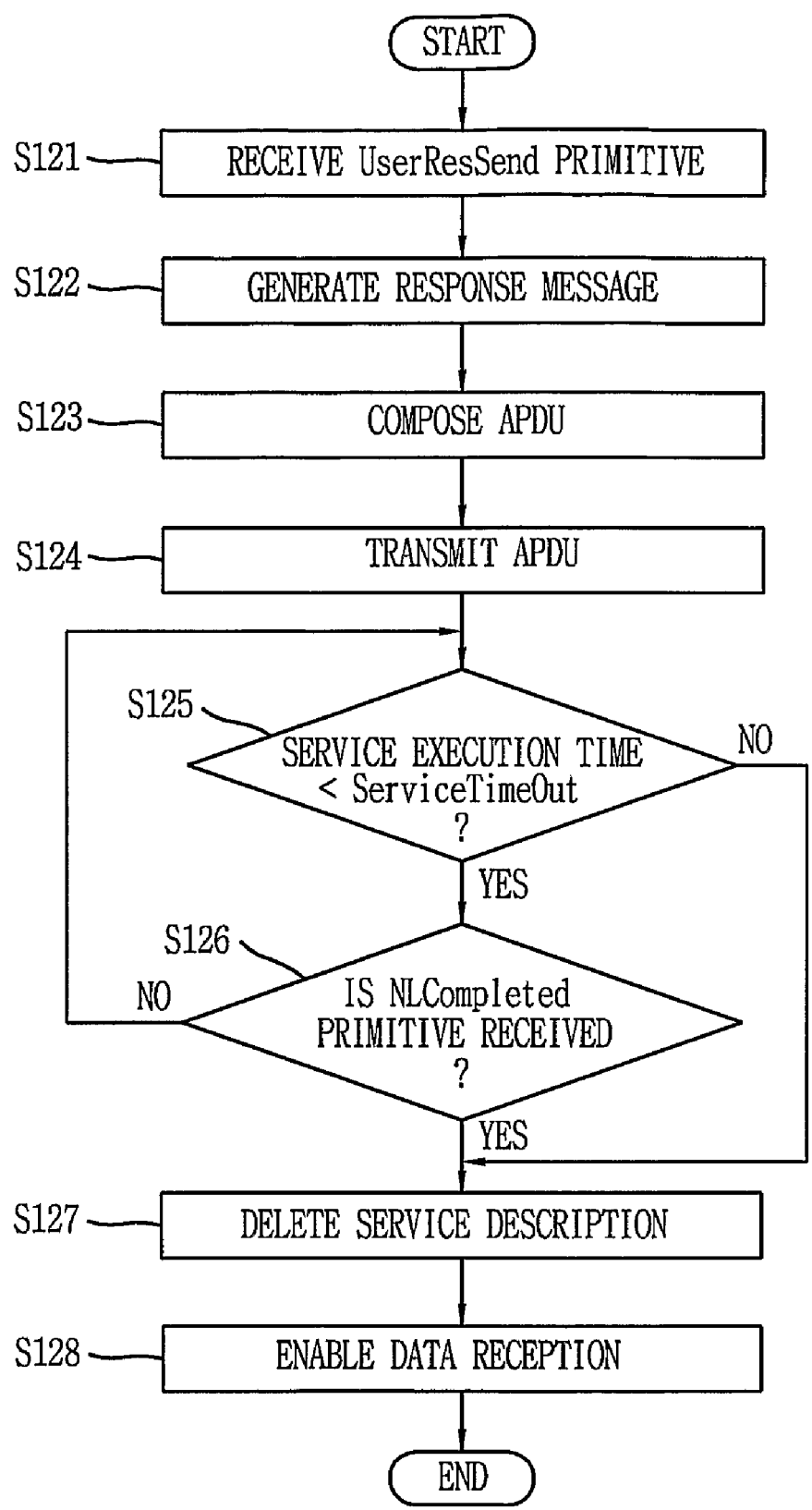
FIG. 24 is a flow chart for explaining a data processing method for application layer in accordance with a fourth embodiment of the present invention.

FIG. 24 is a flow chart for explaining a data processing method for application layer in accordance with a fourth embodiment of the present invention. To summarize the data processing method of this embodiment, the application layer 60a of a slave device receives a user response sending primitive UserResSend from the application software 50a, composes an APDU, and transmits the APDU to the network layer 70a.

In step S121, the application layer 60a of the slave device receives a user response sending primitive UserResSend from the application software 50a, and in step S122, it composes a response message using a response data included in the primitive.

In step S123, the application layer 60a of the slave device composes an APDU by adding headers to the transmitting messages to the network layer 70a. At this time, the value of a field in the header is set as follows.

AL=Number of bytes of a transmitting message+3;
AHL=3; and
ALO=0 (if there is no application layer option).

In step S124, the application layer 60a of the slave device transmits the APDU to the network layer 70a using the response message sending primitive ReqMsgSend.

In step S125, in order to decide whether the communication cycle has been completed, the application layer 60a of the slave device decides if the service execution time is shorter than the service time out SvcTimeOut. If yes, the application layer 60a of the slave device proceeds to step S126, and if not, the application layer 60a of the slave device proceeds to step S127. In step S126, if the network layer completing primitive NLCompleted was received, the application layer 60a of the slave device proceeds to step S127, and if not, the application layer 60a of the slave device proceeds to step S125. Even though the service time out SvcTimeOut has not yet lapsed, if the network layer completing primitive NLCompleted is received, the application layer 60a of the slave device can proceed to step S127. Needless to say, when the service time out SvcTimeOut lapses, the application layer 60a of the slave device always proceeds to step S127.

In step S127, the application layer 60a of the slave device deletes the service description that was pre-generated and stored (please refer to S108 of FIG. 23).

In step S128, the data reception function of the application layer 60a of the slave device is enabled, being ready for receiving data from the network layer 70a.

Figure 25:
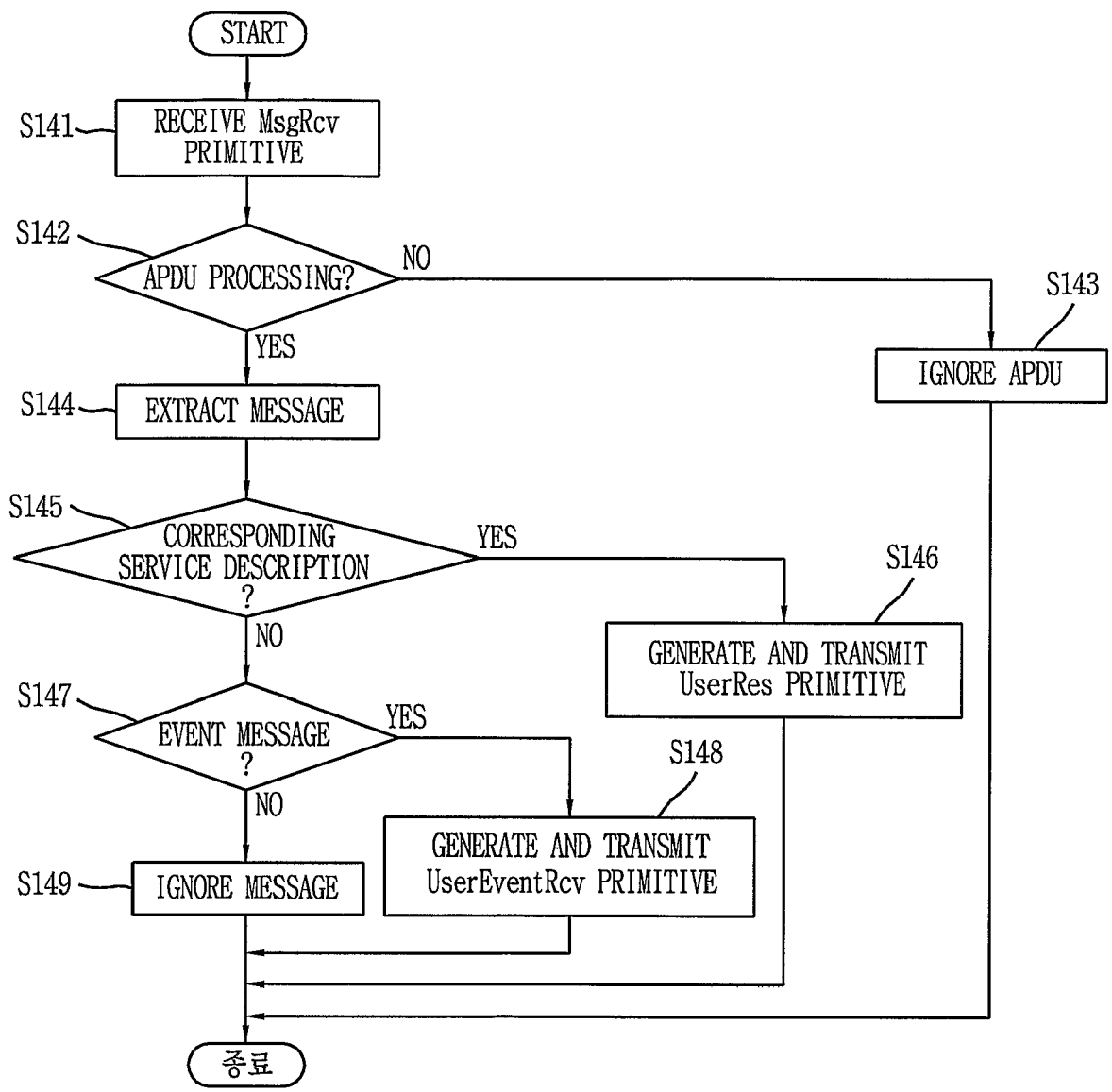
FIG. 25 is a flow chart for explaining a data processing method for application layer in accordance with a fifth embodiment of the present invention.

FIG. 25 is a flow chart for explaining a data processing method for application layer in accordance with a fifth embodiment of the present invention. To briefly explain the data processing method of this embodiment, the application layer 60 of a master device receives a request message receiving primitive ReqMsgRcv from the network layer 70, extracts a message therefrom, and transmits the message to the application software 50a.

In step S141, the application layer 60 of the master device receives a message receiving primitive MsgRcv from the network layer 70.

In step S142, if ALO field value of an APDU included in the received message receiving primitive MsgRcv is not equal to a predetermined value (for example, '0'), the application layer 60 of the master device proceeds to step S143 and ignores the received APDU. However, if the ALO field value equals to the predetermined value, the application layer 60 of the master device proceeds to step S144.

In step S144, the application layer 60 of the master device extracts a message from the APDU using the value of an AHL field. Even though a new field which is not defined may be added to the header of the received APDU, the application layer 60 of the master device should be able to recognize it as the header by designated bytes for the AHL field, and extract the message therefrom.

In step S145, the application layer 60 of the master device checks a service description corresponding to the received message receiving primitive MsgRcv. If there is a service description of the same value with the communication cycle identifier CycleID included in the message receiving primitive MsgRcv, the application layer 60 of the master device proceeds to step S146. However, if there is no such service description, the application layer 60 of the master device proceeds to step S147. The reason for checking the service description in step S145 is to decide whether the message included in the message receiving primitive MsgRcv is a response message. When there is a corresponding service description, it means that there must have been a request message corresponding to the response message (to explain the principles behind, when the application layer 60 of the master device receives a request message from the application software 50 and generates and transmits a user request primitive UserReq to another device, e.g., master device and/or slave device, it also generates and stores a service description for the request message). Here, the service description has a similar structure shown in Table 13.

In step S146, the application layer 60 of the master device generates a user response primitive UserRes including the extracted message, and transmits the UserRes to the application software 50.

In step S147, the application layer 60 of the master device checks whether the extracted message is an event message. Since an event message usually includes a predetermined command code (for example, 0x11), the application layer 60 of the master device can simply check whether or not the extract message includes such command code. If it turns out that the extracted message is an event message, the application layer 60 of the master device proceeds to step S148, and generates a user event receiving primitive UserEventRcv including the extracted message and transmits the UserEventRcv to the application software 50. Meanwhile, if the extracted message turns out to be a request message not an event message, the application layer 60 of the master device proceeds to step S149, and ignores and discards the message.

As explained earlier, the data processing method for application layer according to the present invention uses a control protocol which is a general communication standard for providing functions of controlling and monitoring electric devices in the home network system.

Also, the data processing method for application layer according to the present invention uses a living network control protocol as a general communication standard.

Also, the data processing method for application layer according to the present invention uses a plurality of united primitives for transmitting data in a living network control protocol.

Also, the upper layer including the application layer generates, transmits and processes a message.

Also, according to the characteristics of a message, one or more communication cycles are performed.

Also, the data receiving process is controlled during the predetermined message and packet processing.

Also, the upper layer including the application layer of the slave device generates, transmits, and processes a message.

Also, data processing can be controlled by setting the data reception function to enable or disable state.

Also, the upper layer including the application layer of the master generates, transmits and processes a message.

Also, data is processed according to the characteristics of a message.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A data processing method for application layer based on a predetermined protocol composed of at least a lower layer and an application layer, the method comprising the steps of:
   receiving a primitive from an upper application software;
   generating a communication cycle identifier (CycleID) according to the primitive;
   generating a service description according to the primitive and the communication cycle identifier (CycleID);

composing an application layer protocol data unit (APDU) including the primitive;

transmitting the APDU to the lower layer; and completing a communication cycle, wherein the completion step comprises making a first decision regarding whether the network layer completing primitive (NLCompleted) from the lower layer is received within a service time out (SvcTimeOut).

2. The method of claim 1, wherein if, in the first decision step, the network layer completing primitive (NLCompleted) is received for the service time out (SvcTimeOut), the communication cycle number (CycleNo) included in the service description is reduced by a predetermined value, and if not, the communication cycle number (CycleNo) is set to '0'.

3. The method of claim 1, wherein the completion step further comprises the sub-step of:

making a second decision regarding whether the communication cycle number (CycleNo) included in the service description is '0'.

4. The method of claim 3, wherein if, in the second decision step, the communication cycle number (CycleNo) is '0', the service description is deleted, and if not, the communication cycle identifier (CycleID) is generated or the APDU is composed.

5. The method of claim 1, wherein the completion step further comprises the step of:

if, in the first decision step of the completion, the network layer completing primitive (NLCompleted) is received before the service time out (SvcTimeOut) lapses or if the service time out (SvcTimeOut) lapses, deleting the service description.

6. The method of claim 4, further comprises the step of:

after the service description is deleted, transmitting an application layer completing primitive (ALCompleted) to the application software.

7. The method of claim 1, further comprises the step of:

after the communication cycle identifier (CycleID) is generated, searching a pre-stored service description corresponding to the generated communication cycle identifier (CycleID), so as to decide, based on the search result, whether to generate the service description.

8. The method of claim 1, further comprises the steps of:

after the primitive is received, separating a communication cycle based on an application layer service code (ALSvcCode) included in the primitive; and generating a request or a notification message according to the separated communication cycle, wherein the communication cycle is separated and the request or the notification message is generated during the composition step of the APDU.

9. The method of claim 4, further comprises the steps of:

after the communication cycle identifier (CycleID) is generated, searching a pre-stored service description corresponding to the generated communication cycle identifier (CycleID); and based on the search result, standing by until the searched service description is deleted.

10. The method of claim 1, further comprises the steps of:

after the primitive is received, setting a data reception function to a disable state; and generating an event message including an event code (EventCode) and a state variable (StateVariable) in the primitive, wherein the event message is included in the composing APDU.

11. The method of claim 10 further comprises the step of:

after the service description is deleted, setting the data reception function to an enable state.

12. A data processing method for application layer based on a protocol composed of at least a lower layer and an application layer, the method comprising the steps of:

receiving a request message receiving primitive (ReqMsgRcv) including an application layer protocol data unit (APDU) from the lower layer;

making a first decision regarding whether to process the APDU according to a value of an application layer option (ALO) field in the APDU;

based on a result of the first decision, extracting a message from the APDU;

making a second decision regarding whether to generate a service description according to the request message receiving primitive (ReqMsgRcv);

based on a result of the second decision, generating the service description;

generating a user request receiving primitive (UserReqRcv) primitive including the message; and transmitting the generated user request receiving primitive (UserReqRcv) to an application software.

13. The method of claim 12 further comprises the step of:

after the primitive receiving step, setting a data reception function to an disable state.

14. The method of claim 12, wherein the second decision is made on the basis of a network layer service (NLService) included in the request message receiving primitive (ReqMsgRcv).

15. The method of claim 14, wherein if, in the second decision step, the network layer service (NLService) is acknowledged, the service description is generated, and if the network layer service (NLService) is non-acknowledged, the service description is not generated.

16. The method of claim 12, wherein the service description comprises at least one among an application layer service code (ALSvcCode), an application layer service type (ALSvcType), a communication cycle number (CycleNo), and a communication cycle identifier (CycleID).

17. The method of claim 13 further comprises the step of:

if a network layer service (NLService) of the request message receiving primitive (ReqMsgRcv) is non-acknowledged, setting the data reception function after the transmission of the user request receiving primitive (UserReqRcv) to an enable state.

18. A data processing method for application layer based on a protocol composed of at least a lower layer and an application layer, the method comprising the steps of:

receiving a user response sending primitive (UserResSend) from an upper application software;

generating a response message according to the user response sending primitive (UserResSend);

composing an application layer protocol data unit (APDU) including the response message;

transmitting the ADDU to the network layer using a pre-stored service description; and completing a communication cycle, wherein the completion step comprises making a first decision regarding whether a service execution time from the network layer is within a service time out (SvcTimeOut), and based on a result of the first decision, making a second decision regarding whether a network layer completing primitive (NLCompleted) is received or not.

19. The method of claim 18 further comprises the sub-step of:

deleting the service description.

20. The method of claim 18, wherein if, in the first decision step, the service execution time is for the service time out (SvcTimeOut), the second decision step is performed, and if not, the service description is deleted;
wherein if, in the second decision step, the network layer completing primitive (NLCompleted) is received, the service description is deleted, and if not, the first decision step is performed.

21. The method of claim 19 further comprises the step of:
after the service description is deleted, setting the data reception function to an enable state.

22. A data processing method for application layer based on a protocol composed of at least a lower layer and an application layer, the method comprising the steps of:
receiving a message receiving primitive (MsgRcv) including an application layer protocol data unit (APDU) from the lower layer;
making a first decision regarding whether to process the APDU;
based on a result of the first decision, extracting a message from the APDU;
making a second decision regarding whether a corresponding service description exists;
based on a result of the second decision, generating a predetermined primitive; and
transmitting the generated primitive to an upper application software.

23. The method of claim 22, wherein if, in the second decision step, a service description corresponding to a communication cycle identifier (CycleID) included in the message receiving primitive (MsgRcv) is searched, the message receiving primitive (MsgRcv) comprises a response message.

24. The method of claim 22 further comprises the step of:
making a third decision regarding whether the extracted message is an event message,
wherein if, in the second decision step, a service description corresponding to the communication cycle identifier (CycleID) included in the message receiving primitive (MsgRcv) is not searched, the third decision step is performed.

25. The method of claim 5, further comprises the step of:
after the service description is deleted, transmitting an application layer completing primitive (ALCompleted) to the application software.

26. The method of claim 5, further comprises the steps of:
after the communication cycle identifier (CycleID) is generated, searching a pre-stored service description corresponding to the generated communication cycle identifier (CycleID); and
based on the search result, standing by until the searched service description is deleted.

27. The method of claim 15 further comprises the step of:
if a network layer service (NLService) of the request message receiving primitive (ReqMsgRcv) is non-acknowledged, setting the data reception function after the transmission of the user request receiving primitive (UserReqRcv) to an enable state.

28. The method of claim 19, wherein if, in the first decision step, the service execution time is for the service time out (SvcTimeOut), the second decision step is performed, and if not, the service description is deleted;
wherein if, in the second decision step, the network layer completing primitive (NLCompleted) is received, the service description is deleted, and if not, the first decision step is performed.

29. The method of claim 22, wherein the first decision is made depending on whether a value of an application layer option (ALO) filed of the APDU comprises a predetermined value.

30. The method of claim 29, wherein the message is extracted using a value of an APDU header length (AHL) field in the APDU.

31. The method of claim 24, wherein if, in the third decision step, the extracted message is an event message, a user event receiving primitive (UserEventRcv) is generated in the primitive generation step, if the extracted message is not an event message, ignoring the extracted message.

32. The method of according to claim 24, wherein the third decision is made by comparing and deciding whether a command code of the extracted message is equal to a predetermined value of the event message.

* * * * *